United States Patent
Le et al.

(10) Patent No.: US 9,297,938 B2
(45) Date of Patent: Mar. 29, 2016

(54) METHODS AND APPARATUSES FOR PATTERNED LOW EMISSIVITY PANELS

(71) Applicant: Intermolecular Inc., San Jose, CA (US)

(72) Inventors: Minh Huu Le, San Jose, CA (US); Brent Boyce, Novi, MI (US); Guowen Ding, San Jose, CA (US); Mohd Fadzli Anwar Hassan, San Francisco, CA (US); Zhi-Wen Wen Sun, Sunnyvale, CA (US)

(73) Assignees: Intermolecular, Inc., San Jose, CA (US); Guardian Industries Corp., Auburn Hills, MI (US)

( * ) Notice: Subject to any disclaimer, the term of this patent is extended or adjusted under 35 U.S.C. 154(b) by 489 days.

(21) Appl. No.: 13/715,528

(22) Filed: Dec. 14, 2012

(65) Prior Publication Data

US 2014/0168759 A1    Jun. 19, 2014

(51) Int. Cl.
*G02B 5/20*    (2006.01)
*F21V 9/04*    (2006.01)

(52) U.S. Cl.
CPC ..................... *G02B 5/208* (2013.01)

(58) Field of Classification Search
CPC .... C03C 17/001; C03C 17/002; C03C 17/06; C03C 17/09; C03C 17/10; C03C 17/35; C03C 17/366; G02B 5/00; G02B 5/20; G02B 5/207; G02B 5/208; G02B 5/22
USPC ......................................... 359/360
See application file for complete search history.

(56) References Cited

U.S. PATENT DOCUMENTS

| | | | |
|---|---|---|---|
| 5,162,145 A * | 11/1992 | Schaefer | B32B 17/10036 428/209 |
| 6,356,236 B1 * | 3/2002 | Maeuser | B32B 17/10 343/713 |
| 7,125,462 B2 | 10/2006 | Disteldorf | |
| 8,022,333 B2 * | 9/2011 | Maeuser | B32B 17/10036 219/203 |
| 9,050,779 B2 * | 6/2015 | Derda | B23B 17/10 |
| 2008/0037094 A1 * | 2/2008 | Hwang et al. | 359/238 |
| 2015/0321951 A1 * | 11/2015 | Alzate | C03C 17/3681 428/34 |

* cited by examiner

*Primary Examiner* — Ricky Mack
*Assistant Examiner* — Robert E Tallman

(57) ABSTRACT

A method for making low emissivity panels, comprising forming a patterned layer on a transparent substrate. The patterned layers can offer different color schemes or different decorative appearance styles for the coated panels, or can offer gradable thermal efficiency through the patterned layers.

20 Claims, 9 Drawing Sheets

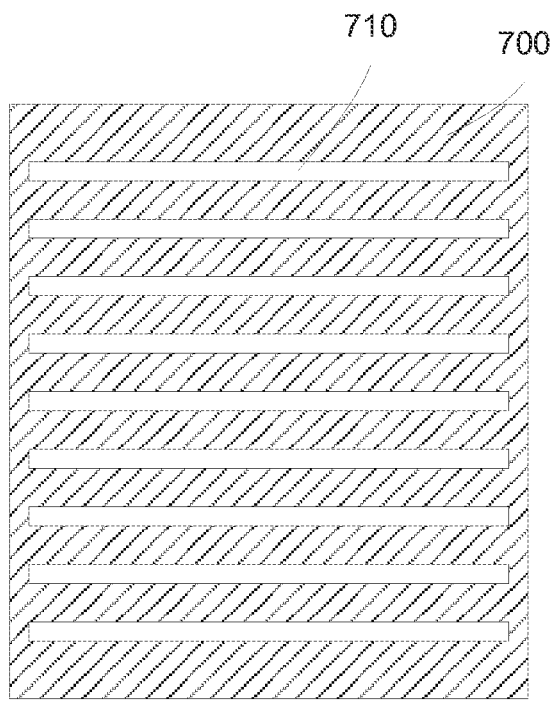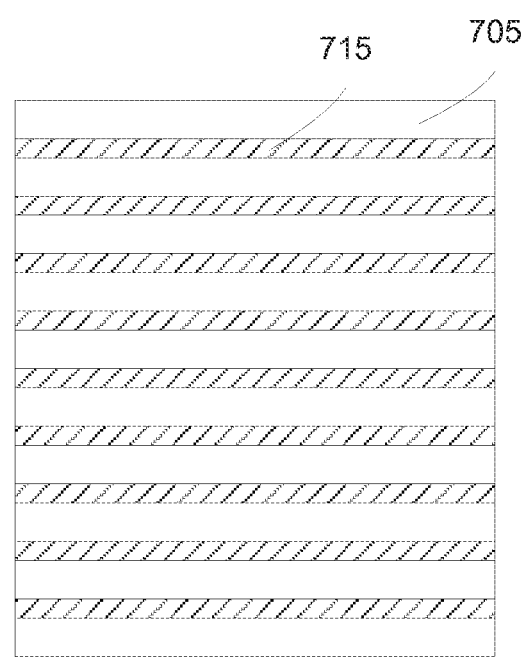
Fig. 7A
Fig. 7B

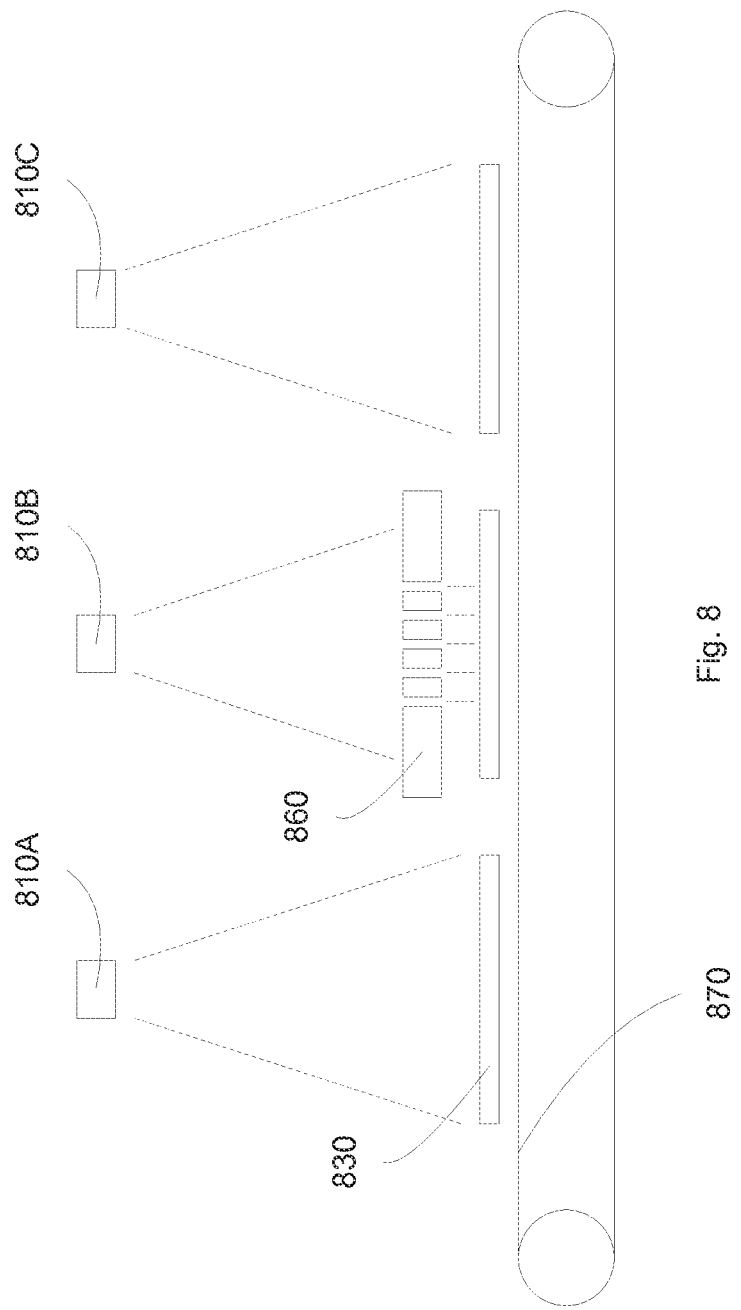

METHODS AND APPARATUSES FOR PATTERNED LOW EMISSIVITY PANELS

FIELD OF THE INVENTION

The present invention relates generally to films providing high transmittance and low emissivity, and more particularly to such films deposited on transparent substrates.

BACKGROUND OF THE INVENTION

Sunlight control glasses are commonly used in applications such as building glass windows and vehicle windows, typically offering high visible transmission and low emissivity. High visible transmission can allow more sunlight to pass through the glass windows, thus being desirable in many window applications. Low emissivity glass can block infrared (IR) radiation to reduce undesirable interior heating.

In low emissivity glasses, IR radiation is mostly reflected with minimum absorption and emission, thus reducing the heat transferring to and from the low emissivity surface. Low emissivity, or low-e, panels are often formed by depositing a reflective layer (e.g., silver) onto a substrate, such as glass. The overall quality of the reflective layer, such as with respect to texturing and crystallographic orientation, is important for achieving the desired performance, such as high visible light transmission and low emissivity (i.e., high heat reflection). In order to provide adhesion, as well as protection, several other layers are typically formed both under and over the reflective layer. The various layers typically include dielectric layers, such as silicon nitride, tin oxide, and zinc oxide, to provide a barrier between the stack and both the substrate and the environment, as well as to act as optical fillers and function as anti-reflective coating layers to improve the optical characteristics of the panel.

Currently, low emissivity glasses have uniform coated layers with focus on optical and thermal properties, such as high visible transmittance and high infrared reflectance. Therefore, is it desirable to form low emissivity glasses with new appearance or styles.

SUMMARY OF THE DISCLOSURE

In some embodiments, the present invention discloses coated panels, and methods for making the coated panels, comprising patterned layers on a transparent substrate. For example, the antireflective coatings or the infrared reflective coatings of the coated panel can comprise a patterned layer, such as by sputter deposition through a mask. The patterned layers can offer different color schemes or different decorative appearance styles for the coated panels, or can offer variable thermal efficiency through the patterned layers.

In some embodiments, the present invention discloses methods for making low emissivity panels in large area coaters. A moving mechanism can be provided to move a substrate forward under one or more sputter targets, to deposit seed, infrared reflective layers, together with other layers. A patterned mask can be positioned between the targets and the substrate to form patterned layers, helping to provide different style or appearance to the coated panels.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which:

FIGS. 7A-7B illustrate an exemplary patterned mask and a corresponding pattern layer according to some embodiments of the present invention.

FIG. 8 illustrates an exemplary in-line deposition system according to some embodiments of the present invention.

DETAILED DESCRIPTION OF THE PREFERRED EMBODIMENTS

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, the present invention discloses methods and apparatuses for making low emissivity panels, comprising forming patterned layers on a transparent substrate. For example, a patterned conductive layer (such as silver, gold or copper) can be fabricated on layers of base or seed films, such as ZnO, SnO or an alloy metal oxide. In some embodiments, the silver layer, seed layer, or base layer can be formed by sputtering through a patterned mask, forming patterned layers on the substrate surface.

In some embodiments, the present invention discloses methods and apparatuses for making low emissivity panels which comprise a low resistivity thin infrared reflective layer comprising a conductive material such as silver, gold, or copper. The thin silver layer can be patterned to achieve a desired effect, such as a decorative appearance or a variable property. For example, different color patterns can be provided through diffraction gratings, or varied thermal efficiency can be provided through varying patterns of the silver layer.

In general, other layers can also be patterned. For example, a varying pattern of an antireflective layer can provide varied reflectance of visible light, leading to varied visible light transmittance. Similarly, different decorative appearance can also be achieved through the patterning of practically any layers in the low-e film stack.

In some embodiments, the present invention discloses an improved coated transparent panel, such as a coated glass, that has acceptable visible light transmission and IR reflection. The present invention also discloses methods of producing the improved, coated, transparent panels, which comprise specific layers in a coating stack.

The coated transparent panels can comprise a glass substrate or any other transparent substrates, such as substrates made of organic polymers. The coated transparent panels can be used in window applications such as vehicle and building windows, skylights, or glass doors, either in monolithic glazings or multiple glazings with or without a plastic interlayer or a gas-filled sealed interspace.

Figure 1A:
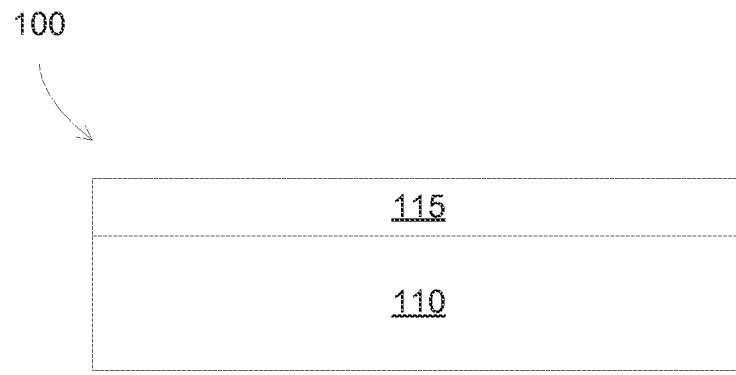
FIG. 1A illustrates an exemplary thin film coating according to some embodiments of the present invention.

FIG. 1A illustrates an exemplary thin film coating according to some embodiments of the present invention. A smooth layer 115 is disposed on a substrate 110 to form a coated transparent panel 100, which has high visible light transmission, and low IR emission.

The layer 115 can be sputtered deposited using different processes and equipment, for example, the targets can be sputtered under direct current (DC), pulsed DC, alternate current (AC), radio frequency (RF) or any other suitable conditions. In some embodiments, the present invention discloses a physical vapor deposition method for depositing a smooth layer 115. The processing can comprise a gas mixture introduced to a plasma ambient to sputtering material from one or more targets disposed in the processing chamber. The sputtering process can further comprise other components such as magnets for confining the plasma, and utilize different process conditions such as DC, AC, RF, or pulse sputtering.

In some embodiments, the smooth layer 115 can comprise a base layer, an oxide layer, a seed layer, a conductive layer, a barrier layer, an antireflective layer, or a protective layer. In some embodiments, the present invention discloses a high transmittance, low emissivity coated article comprising a transparent substrate, and a smooth metallic reflective film comprises one of silver, gold, or copper.

In some embodiments, the present invention discloses a coating stack, comprising multiple layers for different functional purposes. For example, the coating stack can comprise a seed layer to facilitate the deposition of the reflective layer, an oxygen diffusion barrier layer disposed on the reflective layer to prevent oxidation of the reflective layer, a protective layer disposed on the substrate to prevent physical or chemical abrasion, or an antireflective layer to reduce visible light reflection. The coating stack can comprise multiple layers of reflective layers to improve IR emissivity.

Figure 1B:
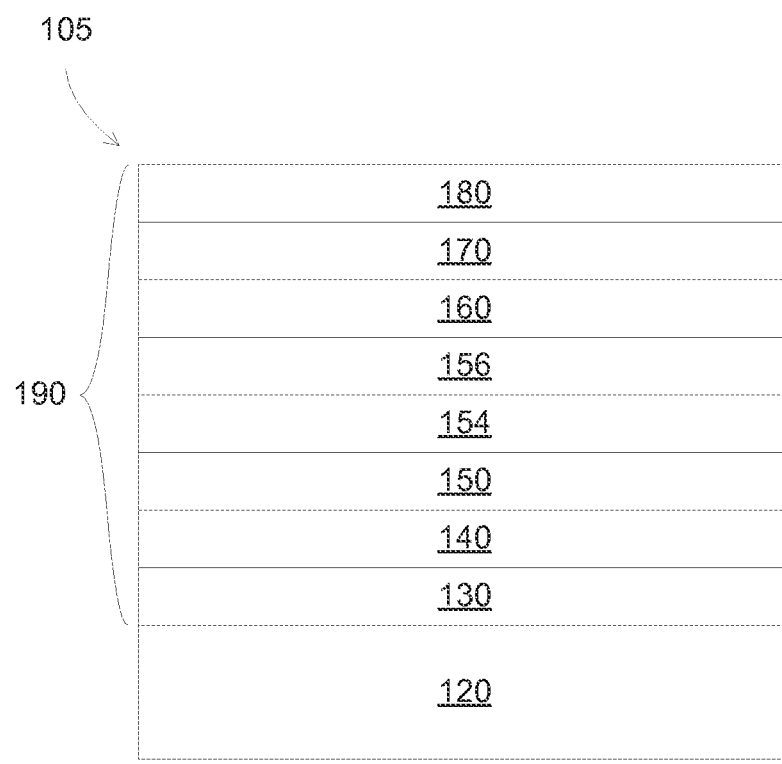
FIG. 1B illustrates a low emissivity transparent panel according to some embodiments of the present invention.

FIG. 1B illustrates a low emissivity transparent panel 105 according to some embodiments of the present invention. The low emissivity transparent panel can comprise a glass substrate 120 and a low-e stack 190 formed over the glass substrate 120. The glass substrate 120 in one embodiment is made of a glass, such as borosilicate glass, and has a thickness of, for example, between 1 and 10 millimeters (mm). The substrate 120 may be square or rectangular and about 0.5-2 meters (m) across. In some embodiments, the substrate 120 may be made of, for example, plastic or polycarbonate.

The low-e stack 190 includes a lower protective layer 130, a lower oxide layer 140, a seed layer 150, a reflective layer 154, a barrier layer 156, an upper oxide 160, an optical filler layer 170, and an upper protective layer 180. Some layers can be optional, and other layers can be added, such as interface layer or adhesion layer. Exemplary details as to the functionality provided by each of the layers 130-180 are provided below.

The various layers in the low-e stack 190 may be formed sequentially (i.e., from bottom to top) on the glass substrate 120 using a physical vapor deposition (PVD) and/or reactive (or plasma enhanced) sputtering processing tool. In one embodiment, the low-e stack 190 is formed over the entire glass substrate 120. However, in other embodiments, the low-e stack 190 may only be formed on isolated portions of the glass substrate 120.

The lower protective layer 130 is formed on the upper surface of the glass substrate 120. The lower protective layer 130 can comprise silicon nitride, silicon oxynitride, or other nitride material such as SiZrN, for example, to protect the other layers in the stack 190 from diffusion from the substrate 120 or to improve the haze reduction properties. In some embodiments, the lower protective layer 130 is made of silicon nitride and has a thickness of, for example, between about 10 nm to 50 nm, such as 25 nm.

The lower oxide layer 140 is formed on the lower protective layer 130 and over the glass substrate 120. The lower oxide layer is preferably a metal oxide or metal alloy oxide layer and can serve as an antireflective layer. The lower metal oxide layer 140 may enhance the crystallinity of the reflective layer 154, as is described in greater detail below.

The seed layer 150 can be used to provide a seed layer for the IR reflective film, for example, a zinc oxide layer deposited before the deposition of a silver reflective layer can provide a silver layer with lower resistivity, which can improve its reflective characteristics. The seed layer can comprise a metal such as titanium, zirconium, and/or hafnium, or a metal alloy such as zinc oxide, nickel oxide, nickel chrome oxide, nickel alloy oxides, chrome oxides, or chrome alloy oxides.

In some embodiments, the seed layer 150 can be made of a metal, such as titanium, zirconium, and/or hafnium, and has a thickness of, for example, 50 Å or less. Generally, seed layers are relatively thin layers of materials formed on a surface (e.g., a substrate) to promote a particular characteristic of a subsequent layer formed over the surface (e.g., on the seed layer). For example, seed layers may be used to affect the crystalline structure (or crystallographic orientation) of the subsequent layer, which is sometimes referred to as "templating." More particularly, the interaction of the material of the subsequent layer with the crystalline structure of the seed layer causes the crystalline structure of the subsequent layer to be formed in a particular orientation.

For example, a metal seed layer is used to promote growth of the reflective layer in a particular crystallographic orientation. In a particular embodiment, the metal seed layer is a material with a hexagonal crystal structure and is formed with a (002) crystallographic orientation which promotes growth of the reflective layer in the (111) orientation when the reflective layer has a face centered cubic crystal structure (e.g., silver), which is preferable for low-e panel applications.

In some embodiments, the crystallographic orientation can be characterized by X-ray diffraction (XRD) technique, which is based on observing the scattered intensity of an X-ray beam hitting the layer, e.g., silver layer or seed layer, as a function of the X-ray characteristics, such as the incident and scattered angles. For example, zinc oxide seed layer can show a pronounced (002) peak and higher orders in a θ-2θ diffraction pattern. This suggests that zinc oxide crystallites with the respective planes oriented parallel to the substrate surface are present.

In some embodiments, the terms "silver layer having (111) crystallographic orientation", or "zinc oxide seed layer having (002) crystallographic orientation" comprise a meaning that there is a (111) preferred crystallographic orientation for the silver layer or a (002) preferred crystallographic orientation for the zinc oxide seed layer, respectively. The preferred crystallographic orientation can be determined, for example, by observing pronounced crystallography peaks in an XRD characterization.

In some embodiments, the seed layer 150 can be continuous and covers the entire substrate. Alternatively, the seed layer 150 may not be formed in a completely continuous manner. The seed layer can be distributed across the substrate surface such that each of the seed layer areas is laterally spaced apart from the other seed layer areas across the substrate surface and do not completely cover the substrate surface. For example, the thickness of the seed layer 150 can be a monolayer or less, such as between 2.0 and 4.0 Å, and the separation between the layer sections may be the result of forming such a thin seed layer (i.e., such a thin layer may not form a continuous layer).

The reflective layer 154 is formed on the seed layer 150. The IR reflective layer can be a metallic, reflective film, such as gold, copper, or silver. In general, the IR reflective film comprises a good electrical conductor, blocking the passage of thermal energy. In some embodiments, the reflective layer 154 is made of silver and has a thickness of, for example, 100 Å. Because the reflective layer 154 is formed on the seed layer 150, for example, due to the (002) crystallographic orientation of the seed layer 150, growth of the silver reflective layer 154 in a (111) crystalline orientation is promoted, which offers low sheet resistance, leading to low panel emissivity.

Because of the promoted (111) texturing orientation of the reflective layer 154 caused by the seed layer 150, the conductivity and emissivity of the reflective layer 154 is improved. As a result, a thinner reflective layer 154 may be formed that still provides sufficient reflective properties and visible light transmission. Additionally, the reduced thickness of the reflective layer 154 allows for less material to be used in each panel that is manufactured, thus improving manufacturing throughput and efficiency, increasing the usable life of the target (e.g., silver) used to form the reflective layer 154, and reducing overall manufacturing costs.

Further, the seed layer 150 can provide a barrier between the metal oxide layer 140 and the reflective layer 154 to reduce the likelihood of any reaction of the material of the reflective layer 154 and the oxygen in the lower metal oxide layer 140, especially during subsequent heating processes. As a result, the resistivity of the reflective layer 154 may be reduced, thus increasing performance of the reflective layer 154 by lowering the emissivity.

Formed on the reflective layer 154 is a barrier layer 156, which can protect the reflective layer 154 from being oxidized. For example, the barrier layer can be a diffusion barrier, stopping oxygen from diffusing into the silver layer from the upper oxide layer 160. The barrier layer 156 can comprise titanium, nickel or a combination of nickel and titanium.

Formed on the barrier layer 156 is an upper oxide layer 160, which can function as an antireflective film stack, including a single layer or multiple layers for different functional purposes. The antireflective layer 160 serves to reduce the reflection of visible light, selected based on transmittance, index of refraction, adherence, chemical durability, and thermal stability. In some embodiments, the antireflective layer 160 comprises tin oxide, offering high thermal stability properties. The antireflective layer 160 can comprise titanium dioxide, silicon nitride, silicon dioxide, silicon oxynitride, niobium oxide, SiZrN, tin oxide, zinc oxide, or any other suitable dielectric material.

Formed on the antireflective layer 160 is an optical filler layer 170. The optical filler layer 170 can be used to provide a proper thickness to the low-e stack, for example, to provide an antireflective property. The optical filler layer preferably has high visible light transmittance. In some embodiments, the optical filler layer 170 is made of tin oxide and has a thickness of, for example, 100 Å. The optical filler layer may be used to tune the optical properties of the low-e panel 105. For example, the thickness and refractive index of the optical filler layer may be used to increase the layer thickness to a multiple of the incoming light wavelengths, effectively reducing the light reflectance and improving the light transmittance.

Formed on the optical filler layer 170 is an upper protective layer 180. An upper protective layer 180 can be used for protecting the total film stack, for example, to protect the panel from physical or chemical abrasion. The upper protective layer 180 can be an exterior protective layer, such as silicon nitride, silicon oxynitride, titanium oxide, tin oxide, zinc oxide, niobium oxide, or SiZrN.

In some embodiments, adhesion layers can be used to provide adhesion between layers. The adhesion layers can be made of a metal alloy, such as nickel-titanium, and have a thickness of, for example, 30 Å.

It should be noted that depending on the exact materials used, some of the layers of the low-e stack 190 may have some materials in common. An example of such a stack may use a zinc-based material in the oxide dielectric layers 140 and 160. As a result, a relatively low number of different targets can be used for the formation of the low-e stack 190.

In some embodiments, the coating can comprise a layer stack having multiple IR reflective layers. In some embodiments, the layers can be formed using a plasma enhanced, or reactive sputtering, in which a carrier gas (e.g., argon) is used to eject ions from a target, which then pass through a mixture of the carrier gas and a reactive gas (e.g., oxygen), or plasma, before being deposited.

In some embodiments, the low-e stack 190 comprises one or more patterned layers, for example, for decorative appearance or for varying effects. The details for the patterned layers will be elaborated in the following sections.

In some embodiments, the layers can be patterned in a sputter deposition chamber that will perform the sputter deposition. For example, the sputter deposition system can comprise a patterned mask, disposed between the target and the substrate. By depositing through the patterned mask, the pattern of the mask can be transferred to the substrate, forming a patterned layer. Other methods of patterning can be used, such as selective shielding or etching.

Figure 2A:
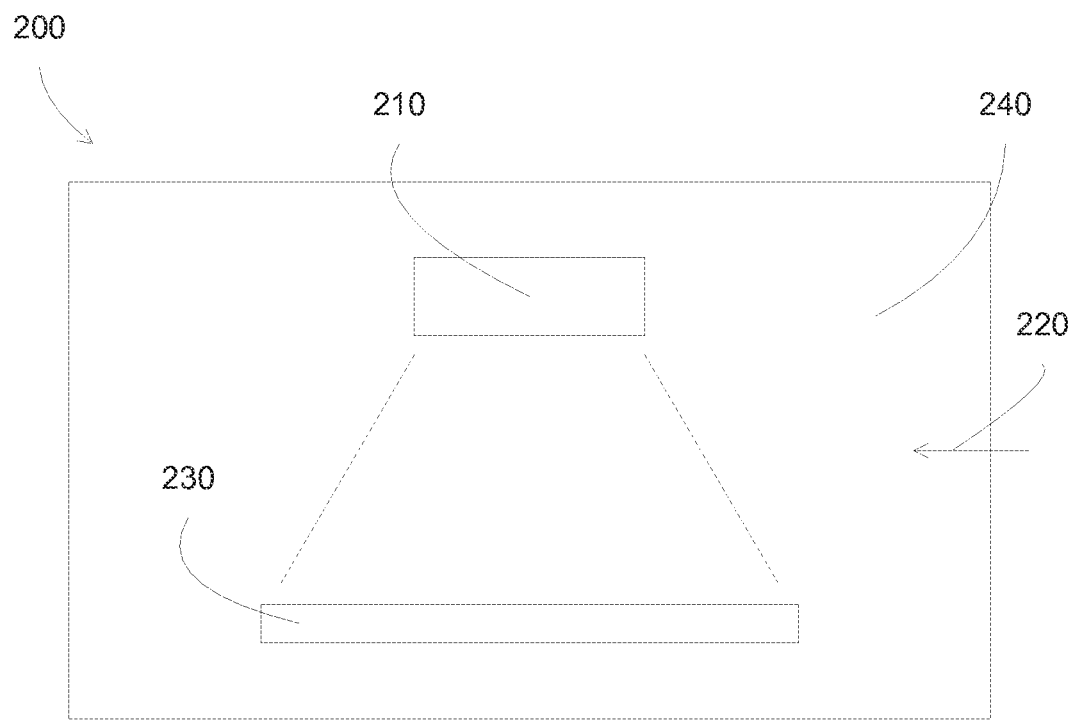
FIGS. 2A-2B illustrates exemplary physical vapor deposition (PVD) systems according to some embodiments of the present invention.
Figure 2B:
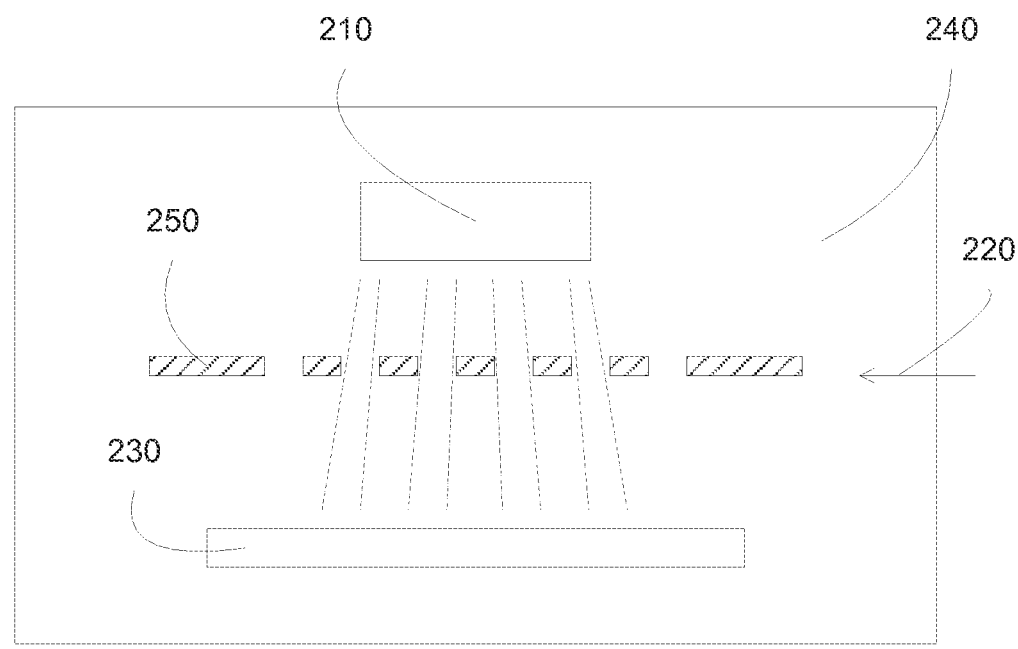

FIGS. 2A-2B illustrates exemplary physical vapor deposition (PVD) systems according to some embodiments of the present invention. In FIG. 2A, a blanket deposition system is shown. A PVD system, also commonly called sputter system or sputter deposition system, 200 includes a housing that defines, or encloses, a processing chamber 240, a substrate 230, a target assembly 210, and reactive species delivered from an outside source 220. The substrate can be stationary, or in some manufacturing environments, the substrate may be in motion during the deposition processes. During deposition, the target is bombarded with argon ions, which releases sputtered particles toward the substrate 230. The sputter system 200 can perform blanket deposition on the substrate 230, forming a deposited layer that cover the whole substrate, e.g., the area of the substrate that can be reached by the sputtered particles generated from the target assembly 210. In the description, blanket deposition can include no obstacle between the target assembly 210 and the substrate 230, where sputtered atoms can reach the substrate without forming any pattern on the substrate.

In FIG. 2B, a pattern deposition is shown, forming a patterned layer on a substrate. A patterned mask 250 can be disposed between the target assembly 210 and the substrate 230, blocking a portion of the sputtered particles generated from the target assembly 210. The pattern of the patterned mask is then transferred to the substrate, creating a deposited layer on the substrate 230 having the same pattern. In general, the resolution of the features on the patterned mask can be dependent on the distance from the substrate. For example, a patterned mask located in close proximity of the substrate can generate a sharp patterned layer on the substrate with almost identical features of the patterned mask. A patterned mask located near the target, e.g., away from the substrate, will generate a blurry image due to spreading angles of the sputtered particles. Thus, in some embodiments, the distance of the patterned mask from the substrate can be used to control the patterned layers of the low-e coating, to achieve a desired feature, such as different decorative appearance or different grading efficiency. Other techniques to form a patterned layer can be used, such as deposition through a shadow mask (where the shadow mask is located in proximity of the substrate) or deposition on a patterned sacrificial layer (where the sacrificial layer is removed after deposition, leaving an image of the patterned sacrificial layer on the substrate).

The materials used in the target assembly 210 may, for example, include tin, zinc, magnesium, aluminum, lanthanum, yttrium, titanium, antimony, strontium, bismuth, silicon, silver, nickel, chromium, copper, gold, or any combination thereof (i.e., a single target may be made of an alloy of several metals). Additionally, the materials used in the targets may include oxygen, nitrogen, or a combination of oxygen and nitrogen in order to form the oxides, nitrides, and oxynitrides described above. Additionally, although only one target assembly 210 is shown, additional target assemblies may be used. As such, different combinations of targets may be used to form, for example, the dielectric layers described above. For example, in an embodiment in which the dielectric material is zinc-tin-titanium oxide, the zinc, the tin, and the titanium may be provided by separate zinc, tin, and titanium targets, or they may be provided by a single zinc-tin-titanium alloy target. For example, the target assembly 210 can comprise a silver target, and together with argon ions, sputter deposit a silver layer on substrate 230. The target assembly 210 can comprise a metal or metal alloy target, such as tin, zinc, or tin-zinc alloy, and together with reactive species of oxygen to sputter deposit a metal or metal alloy oxide layer.

The sputter deposition system 200 can comprise other components, such as a substrate support for supporting the substrate. The substrate support can comprise a vacuum chuck, electrostatic chuck, or other known mechanisms. The substrate support can be capable of rotating around an axis thereof that is perpendicular to the surface of the substrate. In addition, the substrate support may move in a vertical direction or in a planar direction. It should be appreciated that the rotation and movement in the vertical direction or planar direction may be achieved through known drive mechanisms which include magnetic drives, linear drives, worm screws, lead screws, a differentially pumped rotary feed through drive, etc.

In some embodiments, the substrate support includes an electrode which is connected to a power supply, for example, to provide a RF or dc bias to the substrate, or to provide a plasma environment in the process housing 240. The target assembly 210 can include an electrode which is connected to a power supply to generate a plasma in the process housing. The target assembly 210 is preferably oriented towards the substrate 230.

The sputter deposition system 200 can also comprise a power supply coupled to the target electrode. The power supply provides power to the electrodes, causing material to be, at least in some embodiments, sputtered from the target. During sputtering, inert gases, such as argon or krypton, may be introduced into the processing chamber 240 through the gas inlet 220. In embodiments in which reactive sputtering is used, reactive gases may also be introduced, such as oxygen and/or nitrogen, which interact with particles ejected from the targets to form oxides, nitrides, and/or oxynitrides on the substrate.

The sputter deposition system 200 can also comprise a control system (not shown) having, for example, a processor and a memory, which is in operable communication with the other components and configured to control the operation thereof in order to perform the methods described herein.

Figure 3A:
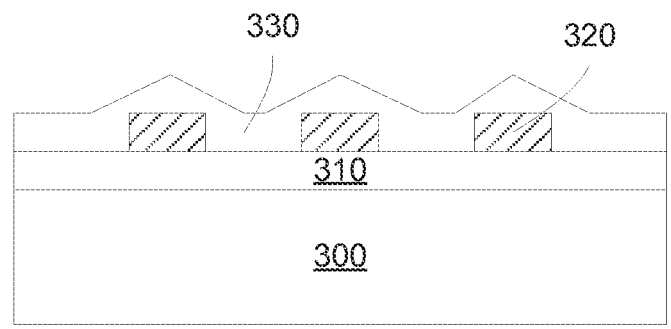
FIGS. 3A-3B illustrate an exemplary patterned layer according to some embodiments of the present invention.
Figure 3B:
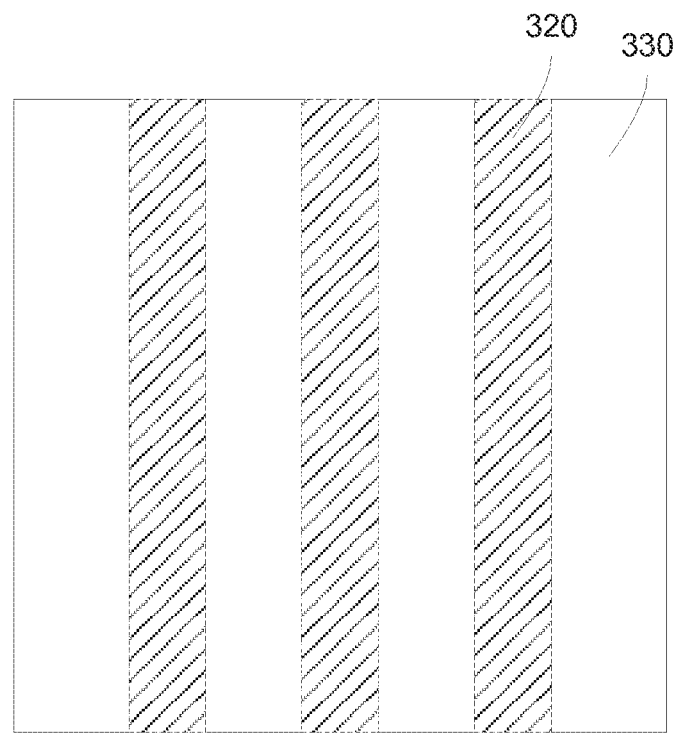

FIGS. 3A-3B illustrate an exemplary patterned layer according to some embodiments of the present invention. FIG. 3A shows a cross section view of a coated panel, and FIG. 3B shows a top view of the same coated panel. A patterned layer 320 is disposed over a substrate 300, such as a glass substrate. Other layers can be included, such as an underlayer 310 between the patterned layer 320 and the substrate 300, and an overlayer 330 on top of the patterned layer 320. As shown, the patterned layer 320 comprises strips of material running along a side of the substrate. Other configurations can also be used, such as wavy lines, dashed lines, etc.

In some embodiments, the present invention discloses coated panels, and methods for making the coated panels, comprising a patterned infrared reflective layer, such as a patterned silver layer. In some embodiments, the patterned silver layer is formed on a blanket silver layer on the substrate. Alternatively, the patterned silver layer can be formed on the substrate, e.g., without a blanket silver layer. The patterned silver layer can provide different appearances for the coated panels. For example, the patterned silver layer can comprise a diffraction grating pattern, allowing the coated panels to have different color appearances with different diffraction gratings. The patterned silver layer can comprise parallel strip patterns, wavy line patterns, dotted patterns, image patterns, etc., allowing coated panels to have different decorative appearances.

In addition, the patterned silver layer can provide different light efficiency with regard to visible light transmittal and infrared light emission. For example, the patterned silver layer can comprise a varying density pattern, allowing the coated panels to have varied infrared red reflectivity, which in turn offer varied thermal efficiency.

In some embodiments, the present invention discloses coated panels, and methods for making the coated panels, comprising a patterned antireflection layer, such as a patterned layer having index of refraction between those of the substrate and air. In some embodiments, the patterned antireflection layer is formed on a blanket antireflection layer on the substrate. Alternatively, the patterned antireflection layer can be formed on the substrate, e.g., without a blanket antireflection layer. Similar to the patterned silver layer, the patterned antireflection layer can provide different appearances for the coated panels, through different patterns such as diffraction grating patterns, parallel strip patterns, waving line patterns, dotted patterns, image patterns, etc. In addition, the patterned antireflection layer can provide different light efficiency, for example, through grading density patterns.

In some embodiments, the present invention discloses coated panels, and methods for making the coated panels, comprising a patterned infrared reflective layer together with a patterned antireflection layer. Further, other layers can also be patterned, such as the base layer or the optical filler layer.

Figure 4A:
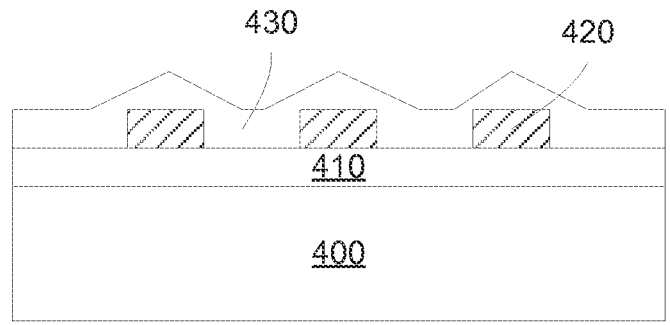
FIGS. 4A-4C illustrate exemplary coating panels having patterned layers according to some embodiments of the present invention.
Figure 4B:
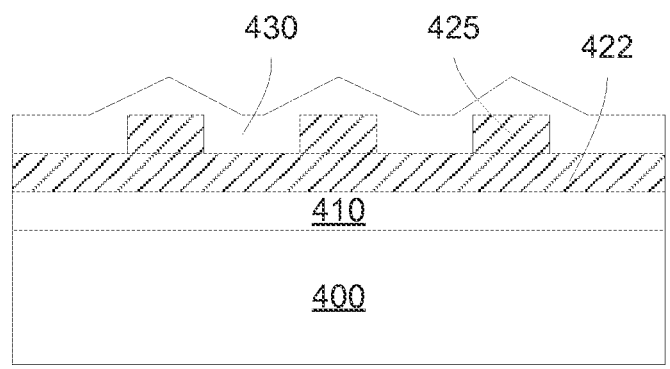
Figure 4C:
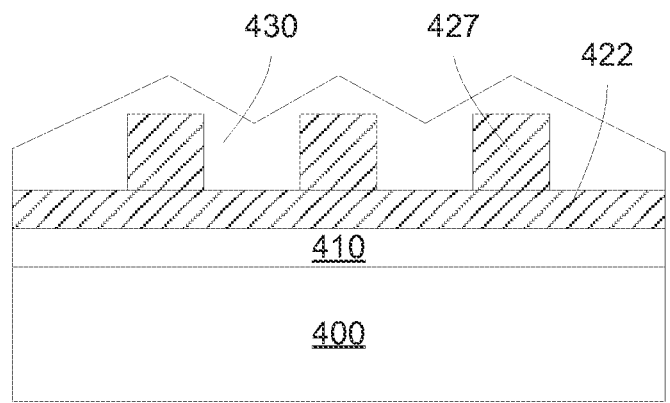

FIGS. 4A-4C illustrate exemplary coating panels having patterned layers according to some embodiments of the present invention. In FIG. 4A, a single patterned layer 420 is used, for example, a patterned silver layer is used for infrared reflectance. Other layers can be included over the substrate 400, such as blanket base layer, antireflective layer or protective layer 410, which is disposed under the patterned silver layer 420. Blanket barrier layer, top protective layer, or top antireflective layer 430 can be included over the patterned silver layer 420. In some embodiments, a blanket low-e stack can be included under or above the patterned silver layer 420, such as a stack comprising a barrier Ti layer over another infrared reflective silver layer over a seed or base ZnO layer.

The single patterned silver layer can provide at least some visible light transmittance, for example, at the areas not covered by the patterned silver layer. For example, a thick silver layer can be used to improve the infrared reflectance, thus blocking light transmittance through the silver portion of the silver layer. However, the patterned silver layer still can provide visible light transmittance, which is related to the area of the silver layer, e.g., the larger the silver portion, the lesser the light transmittance. In some embodiments, other materials can be used, such as copper or gold, to replace silver, since the thickness of the infrared reflective layer is not overly critical for patterned infrared reflective layers.

In FIG. 4B, a patterned layer 425 is used on a blanket layer 422, for example, a patterned silver layer on a blanket silver layer for infrared reflectance. Other layers can be included over the substrate 400, such as blanket base layer, antireflective layer or protective layer 410, which is disposed under the silver layer 422. Blanket barrier layer, top protective layer, or top antireflective layer 430 can be included over the silver layers 425/422. In some embodiments, a blanket low-e stack can be included under or above the silver layers 425/422, such as a stack comprising a barrier Ti layer over another infrared reflective silver layer over a seed or base ZnO layer. In FIG. 4C, the patterned layer 427 can be thicker, for example, twice the thickness of the blanket layer 422.

The single layer 422, and the double layer 425/422 or 427/422 can be optimized for optical, thermal and decorative purposes. The double layer 427/422 can have thicker pattern layer 427 than the blanket layer 422. For example, the single silver layer 422 can provide visible light transmittance and infrared reflectance. The double layer 425/422 or 427/422 can further improve the infrared reflectance, with some reduction in visible light transmittance. In addition, the double and triple layers can be patterned to provide grading effects, such as varying the amount of visible light transmittance or the infrared reflectance across the length of the low-e panel. Further, the double layers can be patterned to provide decorative features, such as different color patterns, different image patterns, or different shading patterns.

The above embodiments describe patterned silver layers, but the invention is not so limited, and can be used for other conductive layers, antireflective layers, etc.

Figure 5A:
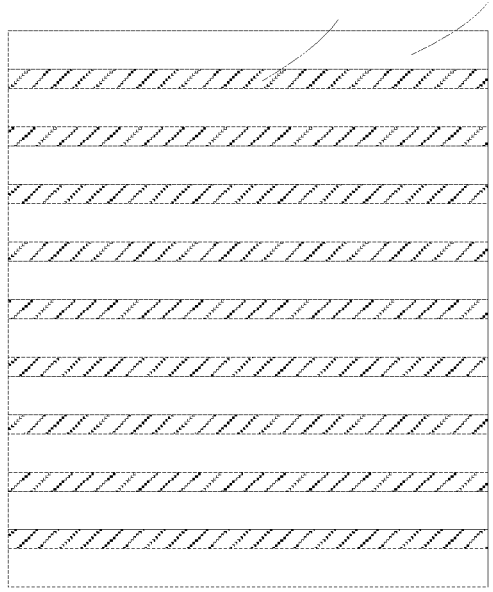
FIGS. 5A-5D illustrate exemplary patterns for the patterned layer according to some embodiments of the present invention.
Figure 5B:
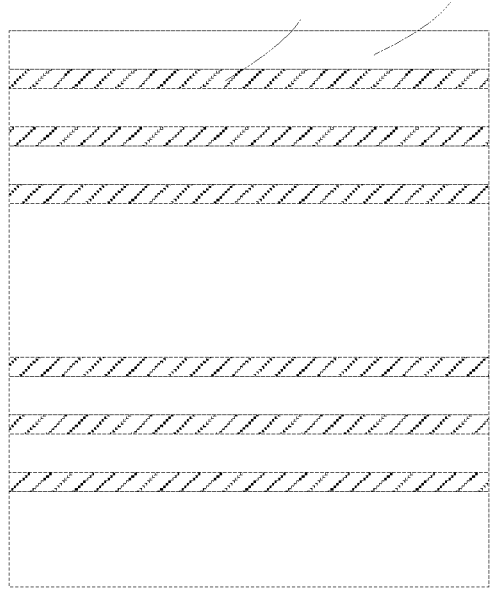
Figure 5C:
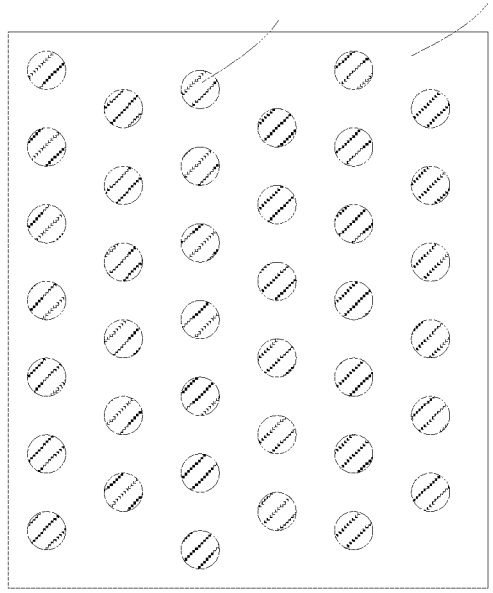
Figure 5D:
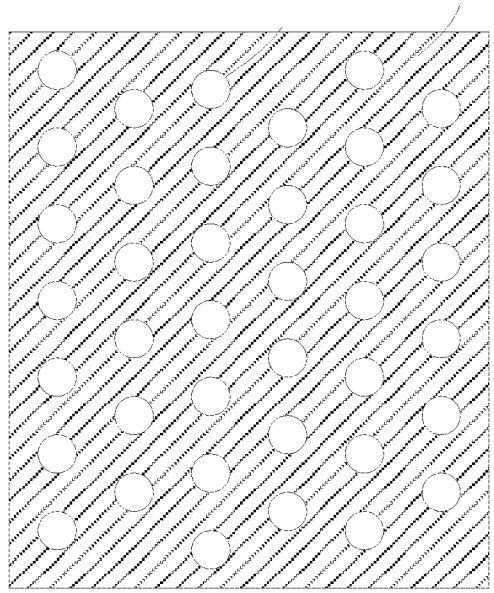

FIGS. 5A-5D illustrate exemplary patterns for the patterned layer according to some embodiments of the present invention. In FIG. 5A, a panel 500 can comprise a pattern 510 having uniform strips. In FIG. 5B, a panel 502 can comprise a pattern 512 having strips with different spacing. In FIG. 5C, a panel 504 can comprise a pattern 514 having circle dots. In FIG. 5D, a panel 506 can comprise a pattern 516 having circle holes, e.g., negative image of circle dots. Other patterns can be used, such as wavy lines or image patterns.

Figure 6A:
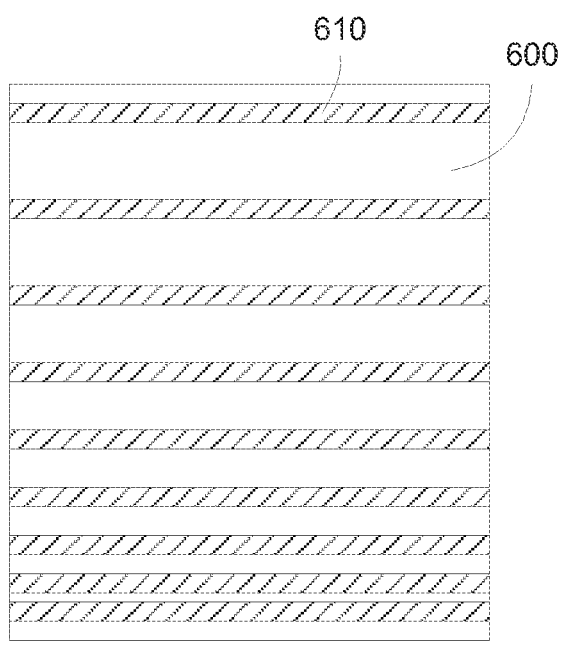
FIGS. 6A-6D illustrate other exemplary patterns for the patterned layer according to some embodiments of the present invention.
Figure 6B:
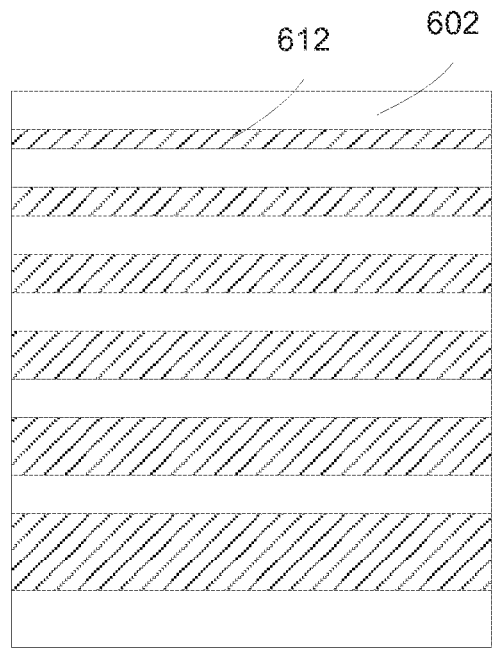
Figure 6C:
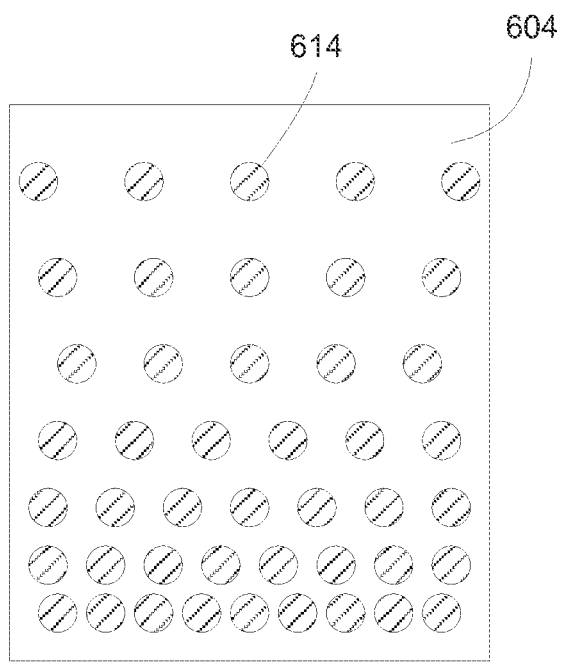
Figure 6D:
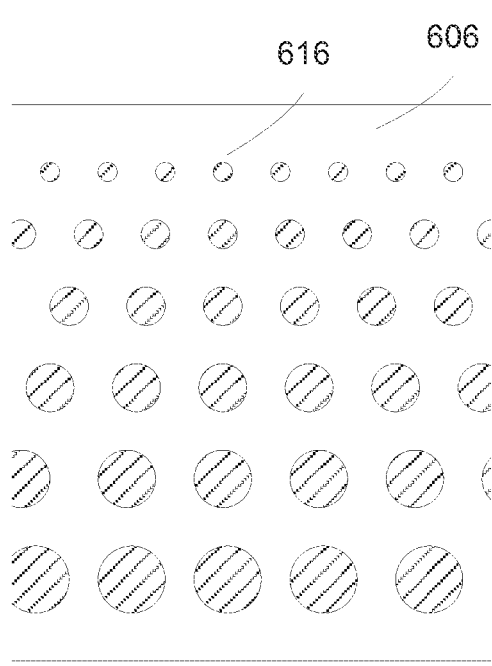

FIGS. 6A-6D illustrate other exemplary patterns for the patterned layer according to some embodiments of the present invention. The patterns can provide varied thermal and/or lighting efficiency through a non-uniform coverage of the patterns. In FIG. 6A, a panel 600 can comprise a pattern 610 having similar size strips but with different spacing between the strips. In FIG. 6B, a panel 602 can comprise a pattern 612 having different size strips with similar spacing. In FIG. 6C, a panel 604 can comprise a pattern 614 having similar size circle dots with different spacing. In FIG. 6D, a panel 606 can comprise a pattern 616 having different size circle dots with similar spacing. The patterns form a gradient of surface coverage, thus can provide a gradual variation of optical or thermal properties. For example, a varying pattern of silver, higher light transmittance can be achieved at panel area with less silver coverage, while lower infrared emissivity can be achieved at panel area with more silver coverage. Other patterns can be used, such as wavy lines or image patterns.

In some embodiments, the present invention discloses methods and apparatuses for making patterned low-e panels, comprising sputter depositing a layer on a substrate through a patterned mask, which can transfer the features on the patterned mask to the substrate. The patterned mask can comprise a negative image of the pattern to be transferred.

FIGS. 7A-7B illustrate an exemplary patterned mask and a corresponding pattern layer according to some embodiments of the present invention. The patterned mask 700 comprises a plurality of features 710, which are removed from the mask to allow the sputtered particles to pass through. The patterned layer 705 is a negative image of the patterned mask, having material in areas 715 where the features 710 are. In general, a patterned layer is first generated, according to some desired objectives, such as varied thermal transfer or color style, and then a negative image of the patterned layer is fabricated to form the patterned mask.

In some embodiments, the patterned mask comprises a plurality of openings, wherein the openings are configured to form a negative image of a desired pattern. The shapes, sizes, and distribution of the openings are configured to achieve a desired objective, such as a color pattern, a decorative appearance style, or a graded thermal of lighting efficiency.

In some embodiments, the present invention discloses sputter systems, and methods to operate the sputter systems, for making coated panels, comprising positioning a patterned mask between a sputter target and a substrate to form deposited patterned layers. In some embodiments, the present invention discloses an in-line deposition system, comprising a transport mechanism for moving substrates between deposition stations. In some deposition stations, a patterned mask can be provided to generate patterned layers.

FIG. 8 illustrates an exemplary in-line deposition system according to some embodiments of the present invention. A transport mechanism 870, such as a conveyor belt or a plurality of rollers, can transfer substrate 830 between different sputter deposition stations. For example, the substrate can be positioned at station #1, comprising a target assembly 810A, then transferred to station #2, comprising target assembly 810B and patterned mask 860, and then transferred to station #3, comprising target assembly 810C. The stations #1 and #3 comprising target assemblies 810A and 810C are conventional sputtering stations, sputtering particles in all directions to form blanket layers. The station #2 comprising target assemblies 810B is a patterned sputtering station, and further comprise patterned mask 860 to transfer a pattern on the patterned mask to the substrate. Other configurations of sputter stations can be used, such as all patterned sputtering stations. In addition, other stations can be included, such as input and output stations, or anneal stations.

After depositing a first blanket layer in station #1, for example, a silver layer for infrared reflective coating, the substrate is moved to station #2, where a patterned silver layer can be deposited through the patterned mask 860. The substrate is then transferred to station #3 to deposit a blanket barrier layer over the silver layers.

Figure 9A:
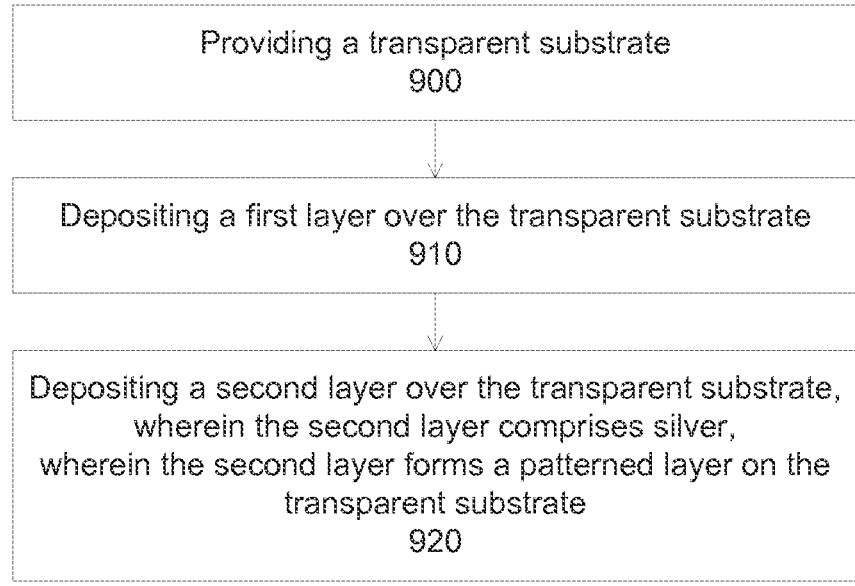
FIGS. 9A-9B illustrate exemplary flow charts for patterned sputtering according to some embodiments of the present invention.
Figure 9B:
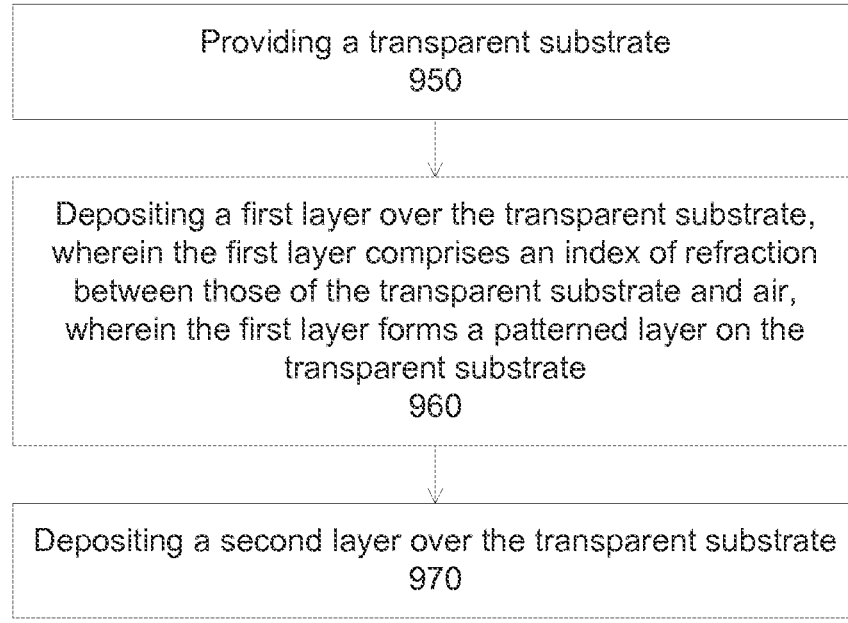

FIGS. 9A-9B illustrate exemplary flow charts for patterned sputtering according to some embodiments of the present invention. FIG. 9A shows a process for forming a patterned silver layer on a layer on a transparent substrate. In operation 900, a transparent substrate is provided. In operation 910, a first layer is deposited over the substrate. The first layer can comprise a base layer or a seed layer, such as a ZnO layer. For example, the first layer can comprise a seed layer having a surface crystal orientation that can serve as a template to promote a desired crystal orientation, e.g., (111), of the subsequently deposited silver layer. The first layer can comprise an antireflective layer, for example, a layer having index of refraction between those of the substrate and air. The first layer can also comprise other types of layers, such as a protective layer, an interface layer or an adhesion layer. The first layer can also comprise a silver layer. In some embodiments, the first layer also forms a pattern layer, for example by depositing through a pattern mask.

In operation 920, a second layer comprising silver is deposited over the transparent substrate, wherein the second layer forms a patterned layer, for example, by a sputter deposition through a patterned mask. In some embodiments, the second layer is deposited after the first layer, i.e., the second layer is disposed on the first layer. In some embodiments, the second layer is deposited before the first layer, i.e., the second layer is disposed under the first layer. In some embodiments, the second layer comprises a diffraction grating layer or a graded patterned layer. For example, the patterned layer can comprise a straight strip patterned layer, a waving strip patterned layer, a dot patterned layer, or a pictural layer.

In some embodiments, the second silver patterned layer is deposited over a third silver layer, which forms a blanket layer. In some embodiments, other layers can be included, such as a protective layer, an oxide layer, a barrier layer, an antireflective oxide, an optical filler layer, an interface layer and an adhesion layer. The additional layers can be sputtered deposited with or without a patterned mask.

FIG. 9B shows a process for forming a layer on a patterned antireflection layer on a transparent substrate. In operation 950, a transparent substrate is provided. In operation 960, a first layer is deposited over the substrate, wherein the first layer comprises an index of refraction between those of the transparent substrate and air, and wherein the first layer forms a patterned layer, for example, by a sputter deposition through a patterned mask. In some embodiments, the first layer comprises a diffraction grating layer or a graded patterned layer. For example, the patterned layer can comprise a straight strip patterned layer, a waving strip patterned layer, a dot patterned layer, or a pictural layer.

In some embodiments, other layers can be included with the first patterned layer, such as a base layer or a seed layer, such as a ZnO layer. For example, the seed layer having a surface crystal orientation that can serve as a template to promote a desired crystal orientation, e.g., (111), of the subsequently deposited silver layer. The first layer can also comprise other types of layers, such as a protective layer, an interface layer or an adhesion layer.

In operation 970, a second layer is deposited over the transparent substrate. In some embodiments, the second layer is deposited after the first layer, i.e., the second layer is disposed on the first layer. In some embodiments, the second layer is deposited before the first layer, i.e., the second layer is disposed under the first layer.

In some embodiments, the second layer comprises silver, acting as an infrared reflective layer. In some embodiments, the second silver layer is also patterned, for example, by depositing through a patterned mask. In some embodiments, the second layer comprises a patterned silver layer disposed on a blanket silver layer. In some embodiments, other layers can be included, such as a protective layer, an oxide layer, a barrier layer, an antireflective oxide, an optical filler layer, an interface layer and an adhesion layer. The additional layers can be sputtered deposited with or without a patterned mask.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method for coating an article, the method comprising:
   providing a transparent substrate;
   depositing a first layer over the transparent substrate, wherein the first layer comprises an index of refraction between those of the transparent substrate and air, wherein the first layer comprises a crystal orientation enabling an (111) crystal orientation of silver; and
   depositing a second layer over the first layer, wherein the second layer comprises silver and is divided into a plurality of portions spaced across the first layer, and wherein a size of the plurality of portions is varied, a distance between adjacent ones of the plurality of portions is varied, or a combination thereof.

2. A method as in claim 1 wherein the plurality of portions of the second layer comprises a plurality of strips.

3. A method as in claim 1 wherein the plurality of portions of the second layer comprises a plurality of circle-shaped dots.

4. A method as in claim 1 wherein the size of the plurality of portions of the second layer is varied.

5. A method as in claim 1 wherein the distance between adjacent ones of the plurality of portions of the second layer is varied.

6. A method as in claim 1 wherein the first layer comprises silver.

7. A method as in claim 1 further comprising depositing a third layer between the first layer and the second layer, wherein the third layer comprises silver, wherein the third layer forms a blanket layer on the transparent substrate.

8. A method as in claim 1 wherein the first layer comprises at least one of titanium, zirconium, hafnium, or a combination thereof.

9. A method as in claim 1 further comprising forming a third layer over the second layer.

10. A method for coating an article, the method comprising:
    providing a transparent substrate;
    depositing a first layer over the transparent substrate, wherein the first layer comprises an index of refraction between those of the transparent substrate and air, wherein the first layer comprises a crystal orientation enabling an (111) crystal orientation of silver; and depositing a second layer over the transparent substrate, wherein the second layer comprises silver and is divided into a plurality of spaced portions, and wherein a size of the plurality of portions is varied or a distance between adjacent ones of the plurality of portions is varied.

11. A method as in claim 10 wherein the plurality of spaced portions of the second layer comprises a plurality of strips or a plurality of circle-shaped dots.

12. A method as in claim 11 wherein the size of the plurality of spaced portions of the second layer is varied.

13. A coated article comprising:
a transparent substrate;
a first layer formed over the transparent substrate, wherein the first layer comprises an index of refraction between those of the transparent substrate and air, wherein the first layer comprises a crystal orientation enabling an (111) crystal orientation of silver; and
a second layer formed over the first layer, wherein the second layer comprises silver and is divided into a plurality of portions spaced across the first layer, and wherein a size of the plurality of portions is varied, a distance between adjacent ones of the plurality of portions is varied, or a combination thereof.

14. An article as in claim 13 wherein the plurality of portions of the second layer comprises a plurality of strips.

15. An article as in claim 13 wherein the plurality of portions of the second layer comprises a plurality of circle-shaped dots.

16. An article as in claim 13 further comprising a third layer formed between the first layer and the second layer, wherein the third layer comprises an index of refraction between those of the transparent substrate and air, wherein the third layer forms a blanket layer.

17. An article as in claim 13 further comprising a third layer formed between the first layer and the second layer, wherein the third layer comprises silver, wherein the third layer forms a blanket layer.

18. An article as in claim 13 wherein the first layer comprises at least one of titanium, zirconium, hafnium, or a combination thereof.

19. An article as in claim 13 further comprising a third layer formed over the second layer.

20. An article as in claim 13 wherein the distance between adjacent ones of the plurality of portions of the second layer is varied.

* * * * *